Patented Aug. 20, 1946

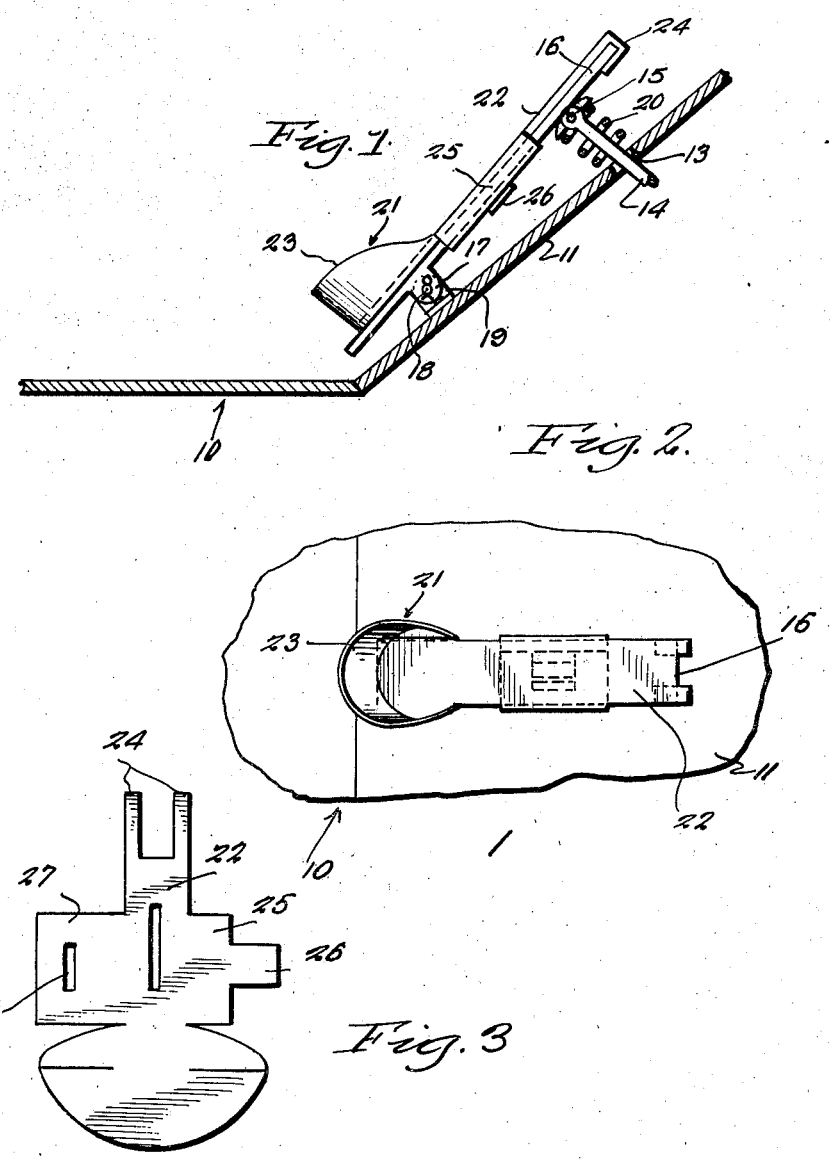

2,406,161

UNITED STATES PATENT OFFICE 2,406,161

MOTOR VEHICLE ATTACHMENT

Joseph Paymer, Brooklyn, N. Y.

Application February 19, 1945, Serial No. 578,733

1 Claim. (Cl. 74—513)

This invention relates to improvements in motor vehicle attachments and more particularly to a foot support for application to the accelerator pedal of a motor vehicle.

The primary object of this invention is to relieve fatigue and to overcome the discomfort frequently accompanying the maintenance of the foot in a fixed position on the accelerator pedal of a motor vehicle during long periods of driving.

Another object is to sustain the foot in a comfortable position as best suited to the driver.

The above and other objects may be attained by employing this invention which embodies among its features an attachment adapted to be adjustably secured to the accelerator pedal of a motor vehicle which comprises a foot supporting shield adapted to engage the heel of the driver and a toe portion having prongs which may be bent over the upper end of the accelerator pedal for sustaining the attachment in position thereon.

Other features embody means for clamping the attachment about the sides of the accelerator pedal so that it may be slidably adjusted to the desired position in which it is held by the prongs.

In the drawing:

Figure 1 is a sectional view through a floor board showing an accelerator pedal with this improved attachment in place thereon.

Figure 2 is a top plan view of Figure 1, and

Figure 3 is a plan view of the blank forming this improved attachment.

Referring to the drawing in detail, the floor board designated generally 10 is provided with an inclined portion 11 in the customary manner which, in turn, is formed with an opening 13 for the accelerator rod 14 which terminates at its upper end in a head pierced to receive a pivot 15 to which the upper end of the accelerator pedal 16 is pivotally attached. Depending from the side edges of the accelerator pedal 16 near its lower end is a pair of ears 17 which are pierced to receive a pivot 18 supported in a bracket 19 which is attached to the floor board as shown in Figure 1. The accelerator pedal may be sustained in elevated position by means of a coil spring 20 which surrounds the rod 14 as illustrated.

My improved foot support designated generally 21 comprises a base plate 22 having formed integrally therewith a heel sustaining portion 23. Formed at the end of the base plate 22 opposite that on which the heel sustaining portion 23 is formed, is a pair of tines 24 which are adapted to be bent around the upper end of the accelerator pedal 16 as illustrated in Figure 1 to sustain the attachment in proper position on the pedal. Projecting laterally from the base plate 22 intermediate its ends is an extension 25 carrying a tongue 26 and formed integrally with the base plate 22 on the side opposite the extension 25 is an extension 27 having a slot 28 which when the extensions 25 and 27 are bent around the accelerator pedal as illustrated in Figure 1 is in a position to receive the tongue 26.

In applying the device to the accelerator pedal the base plate 22 is placed on top of the pedal as illustrated in Figure 1 and the extensions 25 and 27 are bent around the sides and under the bottom face of the pedal so as to completely embrace the same. The tongue 26 is then entered into the slot 28 and it will be seen that the base plate 22 will then be secured to the pedal for longitudinal sliding movement. Having thus secured the attachment to the accelerator pedal the device is adjusted to the most comfortable position for the driver and the tines 24 are bent around the upper end of the accelerator pedal as illustrated in Figure 1 to hold the device and prevent it from slipping downwardly. The device is susceptible of ready re-adjustment to suit other drivers by releasing the tines 24 from engagement with the upper end of the pedal and moving the base plate longitudinally of the pedal to the desired position after which the tines may again be bent and the attachment will be then held in proper position for the most comfortable operation of the vehicle.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

In a device of the character described, a base plate, a heel sustaining member at one end of the base plate, a pair of tines at the opposite end of the base plate, an extension on each side of the base plate intermediate its ends, a tongue on one of said extensions and a slot in the opposite extension for the reception of the tongue, said extensions being adapted to be bent around the accelerator pedal of a motor vehicle and the tongue entered in the slot.

JOSEPH PAYMER.